TELEPHONE DIAL TESTER

LOUIS P. LABARGE
IRVING A. SHEDD
INVENTORS.

BY Huebner & Worrel
ATTORNEYS.

TELEPHONE DIAL TESTER

Filed May 4, 1962 2 Sheets-Sheet 2

INVENTORS.
LOUIS P. LA BARGE
IRVING A. SHEDD
BY Huebner & Worrel
ATTORNEYS.

3,243,526

TELEPHONE DIAL TESTER

Louis P. La Barge, Los Angeles, and Irving A. Shedd, Newport Beach, Calif., assignors to Teletek, Inc., Costa Mesa, Calif., a corporation of California Filed May 4, 1962, Ser. No. 192,586
17 Claims. (Cl. 179—175.2)

The present invention relates to telephone test equipment, and it relates more particularly to an electronic device for quickly and easily testing the various parameters of a telephone dial, including the dial speed in pulses per second, the make-break ratio of the dial pulses, the S.A.T.T. (Strowger Automatic Toll Ticketing) pulse duration, and the S.A.T.T. overlap, i.e. the time relationship between the S.A.T.T. pulses and the dial pulses. All telephone dials have methods of adjustment for the various parameters tested, so that proper adjustment can be made according to the test results.

The conventional telephone dial is a mechanical device embodying switching structure which interrupts direct current flowing through the dial pulse contacts so as to generate a series of electrical pulses. These pulses in turn operate central office equipment that connects the calling party to the station being called. Proper operation of this central office equipment depends upon correct dial speed and pulse width from the dial. In telephone terminology, the dial speed is defined in pulses per second, while the pulse width is the make-break ratio defined as the percentage of make or break of one complete pulse. Depending on the requirements of particular telephone companies, the dial speed will normally lie within the limits of between 8 and 12 pulses per second, and the make-break ratio will normally be within the limits of from 38 to 42 percent make and from 62 to 58 percent break, respectively.

Some dials also have a feature for station identification for use with Strowger Automatic Toll Ticketing (S.A.T.T.), the S.A.T.T. feature supplying another series of pulses from separate switching structure associated with the dial. The S.A.T.T. pulses are usually provided concurrently with the 8th, 9th or 10th dial pulse, or with any combination of these dial pulses, and the S.A.T.T. pulses for proper operation must have a particular duration, normally about 30 milliseconds, and must occur during the period that the dial contacts are in the make condition.

The present invention is adapted for electrical connection to any telephone dial, and embodies an electronic timing or computer circuit arrangement which, according to the positioning of a master selector switch, will provide information for computing: (1) the dial speed in pulses per second: (2) the average percentage of make or break of the pulses; and (3) the time duration of the S.A.T.T. pulses. The circuit of the present invention is also adapted for measuring, by visual means of a light, the overlap or synchronous operation of the S.A.T.T. pulses with respect to the normal dial pulses.

Timing in the present invention is provided by means of a one thousand cycle oscillator, the output of which is fed to a Schmitt trigger which is gated according to the type of measurement being taken, the Schmitt trigger providing output pulses of uniform amplitude to a decade counting circuit comprising a series arrangement of three decade counters. Accordingly, the decade counter circuit will record the number of pulses derived from the oscillator during the time that the Schmitt trigger permits passage of these pulses, and since the oscillator oscillates at 1000 cycles per second, the total reading on and decade counter unit will correspond to the number of milliseconds of time that the Schmitt trigger permits passage of the oscillator pulses.

The Schmitt trigger is turned on and off by a gate tube which is controlled by three different inputs, depending upon the position of the master selector switch.

In a first position of the selector switch the circuit is established for measuring dial speed. The circuit is then actuated by rotation of the telephone dial finger wheel clockwise, the finger hole corresponding to zero being rotated all of the way to the finger stop and then being released, which results in ten openings and closings of the dial pulse contacts, the start of each of the dial pulses comprising an opening of the contacts which represents the negative part of the dial pulse. The gate tube with this circuit arrangement causes the Schmitt trigger to operate at the commencement of the first pulse, i.e., when the dial contacts open for the first time upon release of the finger wheel, and the Schmitt trigger continues to operate until the commencement of the tenth pulse, corresponding to the end of the ninth pulse, when the pulse contacts open for the last time, at which time the gate tube shuts off the Schmitt trigger. Measurement is not taken to the end of the tenth pulse for the reason that there is no electrical distinction between the end of the tenth pulse and shorting of the pulse contacts. Thus, for the dial speed measurement, the decade counter unit will record in milliseconds the time required for the dial to provide nine full pulses. For example, when the dial is adjusted for ten pulses per second, the decade counted unit should then record 900 milliseconds.

In a second position of the selector switch, the switch rearranges the circuit so that the gate tube causes the Schmitt trigger to operate only during the break period of the dial pulse contacts, the decade counter unit measuring in milliseconds the total intervals of time that the dial pulse contacts are broken during the ten pulses of a complete rotation of the dial. Comparison of this total break time with the dial speed already measured in the first position of the selector switch may then be made to determine the percent break ratio or make ratio. For example, where the dial speed has been computed at ten pulses per second, a read out of 600 on the decade counter unit for the total break time indicates a break ratio of 60% and a make ratio of 40%.

The S.A.T.T. pulse time duration is measured in a third position of the selector switch, wherein the gate tube turns the Schmitt trigger on only during the time that the S.A.T.T. contacts of the dial are closed, this time being displayed on the decade counter unit in milliseconds.

The final or fourth position of the selector switch is for measuring the S.A.T.T. overlap, and in this position of the switch the electronic circuitry of the present invention is avoided and both the dial pulse contacts and the S.A.T.T. contacts are electrically connected through the switch to respective incandescent lamps. For proper operation of the S.A.T.T. central office equipment, the S.A.T.T. pulse should occur during the make time of the dial pulse contacts, and this relationship between the S.A.T.T. contacts and the dial pulse contacts is determined by rotating the dial and slowly returning it to normal. For proper operation, the dial pulse light should come on first, and then the S.A.T.T. light, and then the S.A.T.T. light should go out first and then the dial pulse light should go out. If other than this sequence occurs, the overlap is out of adjustment.

Heretofore, conventional practice in testing a telephone dial was to use a millivolt meter or microvolt meter to read the charges of a capacitor while the ten dial pulses were fed to the capacitor. With this prior art method, the test information was difficult to interpret to determine proper adjustment of the dial speed, make-break ratio and S.A.T.T. pulse duration, and the accuracy of the test information was always open to question since direct time reading was not possible.

It is accordingly an object of the present invention to provide a telephone dial test device which may be electrically connected to any telephone dial and which, according to the position of a control switch, will provide direct time read out information for determining (1) dial speed, (2) percent make-break of the dial pulse contacts, and (3) S.A.T.T. pulse duration; and which also provides visual indication of the S.A.T.T. overlap.

Another object of the present invention is to provide a telephone dial test device which embodies electronic decade counting circuitry for direct and positive timing of the operation of the dial pulse contacts and the S.A.T.T. contacts for greatly simplified and highly accurate testing and readjustment of the operation of a telephone dial.

Further objects and advantages of this invention will appear during the course of the following part of this specification, wherein the details of construction, mode of operation and novel method steps of a preferred embodiment are described with reference to the accompanying drawings, in which.

Figure 1:
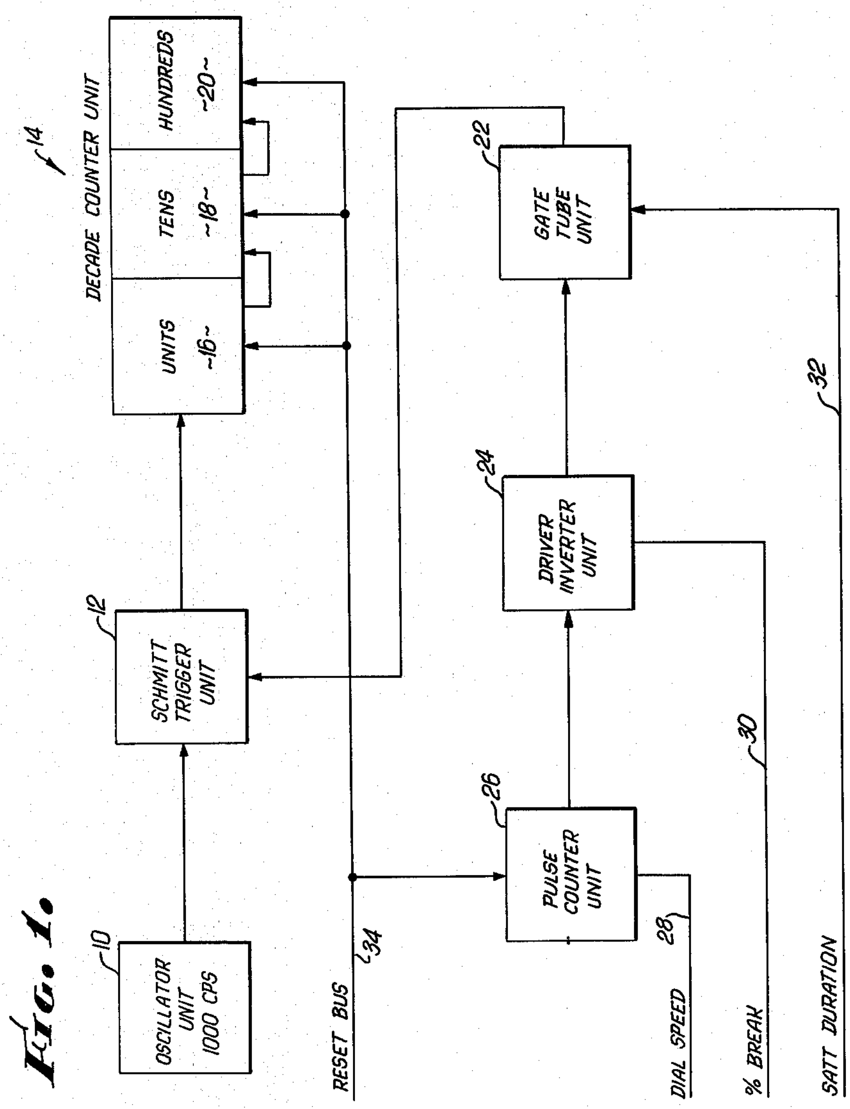
FIG. 1 is a block diagram illustrating the principal circuit components of the present invention in simplified form.

Referring at first to the simplified block diagram of FIG. 1, timing in the present device is initiated by means of an oscillator unit 10 which is adjustable to oscillate at 1000 cycles per second. The presently preferred oscillator is a free running multivibrator of standard design with adjustments for setting the frequency at 1000 cycles per second. Any other desired type of oscillator unit may be employed, as for example a unit comprising two crystal oscillators separated by 1000 c.p.s. so as to provide a beat frequency of 1000 c.p.s. The output of oscillator unit 10 is fed to the input of a Schmitt trigger unit 12 which, when operating, provides output pulses of uniform amplitude at the rate of 1000 pulses per second and when not operating is in a condition of cutoff and provides no output pulses.

During the period of time or intervals of time that the Schmitt trigger unit 12 is operating, its output pulses are fed to a decade counter unit 14 comprised of three sections arranged in series, the first section being units decade counter 16, the second section being tens decade counter 18, and the third section being hundreds decade counter 20. Each of the three counter sections 16, 18 and 20 includes a cold cathode decade counter tube wherein visual read out occurs by observing the positioning of the ion glow. An important characteristic of the counter tubes employed in the units section 16 and the tens section 18 is that they each provide an output pulse across their cathode resistor whenever the ion glow appears at zero. Thus, each time the units section 16 has received ten pulses from the Schmitt trigger it will provide an output pulse to the tens section 18, and each time the tens section 18 has received ten pulses from units section 16 it will provide an output pulse to the hundreds section 20. Accordingly, the total number of pulses received from Schmitt trigger unit 12 will be recorded on the decade counter unit 14 until a reset operation is effected.

The Schmitt trigger 12 is turned on and off by means of a gate tube unit 22 which when conducting cuts the Schmitt trigger off by raising the cathode voltage of the Schmitt trigger above the cutoff level, and which when not conducting causes lowering of the Schmitt trigger cathode voltage so that the Schmitt trigger will operate. The gate tube unit 22 is caused to operate by information fed to it from a telephone dial selectively from one of three separate channels, the selection being made by means of the master selector switch illustrated in FIG. 2 of the drawings.

When the telephone dial speed is being measured, the gate tube is cut off so that the Schmitt trigger will operate and the decade counter unit 14 will count during the period of time from the start of the first dial pulse to the start of the tenth dial pulse; i.e., during a full nine dial pulses. During this measurement, the gate tube 22 is actuated by the output of a driver-inverter unit 24 which is in turn actuated by the output of a pulse counter unit 26, the input of which includes dial pulse conductor 28 which is connected to the dial pulse contacts by the selector switch when the dial speed measurement is being made. The pulse counter unit 26 includes a decade counter tube like those employed in the decade counter unit 14, and the pulse counter unit 26, upon receipt of the first of ten dial pulses, opens the gate unit 22 through the driver-inverter unit 24 permitting the Schmitt trigger to operate so that the decade counter unit 14 will count the pulses from the 1000 c.p.s. oscillator. Then, on the leading edge of the tenth dial pulse, which is the end of the ninth pulse, the pulse counter unit closes the gate tube unit 22, thus stopping the operation of the Schmitt trigger 12. The number of pulses, each corresponding to one millisecond of time, counted on the decade counter unit 14 remains displayed until the device is reset or another dial sequence is made, so that the time of the dial rotation for the first nine pulses can be read on the decade counter unit display in actual milliseconds of time. As an example, where the dial speed is ten pulses per second, the decade counter unit 14 would have a read out of 900 milliseconds, corresponding to the first nine dial pulses.

Where the measurement to be made is the dial percent break or the make-break ratio of the dial pulse contacts, the pulse counter unit 26 is bypassed, and the master selector switch connects the pulse contacts directly to the driver-inverter unit 24 through a conductor 30. When the dial is rotated fully and then released, the driver-inverter unit 24 causes the gate unit 22 to open and the Schmitt trigger 12 to operate during the ten negative dial pulses corresponding to the intervals of time that the dial pulse contacts are broken. This will result in a reading on the decade counter unit 14 corresponding to the total intervals of time in milliseconds that the dial pulse contacts are broken during the ten pulses of one complete rotation of the dial.

The dial percent break test is made after the dial speed has been measured and adjusted, and the percent make and make-break ratio can then readily be computed by comparing the total break time with the total time required for ten pulses as computed from the dial speed test. As an example, assume a case where it is desired to have a 60% break ratio regardless of dial speed. For a dial speed of 10 pulses per second, the read out on decade counter unit 14 during the dial percent break test would be 600 milliseconds. At a dial speed of 11 pulses per second, a break ratio of 60% would provide a read out on decade counter unit 14 of 546 milliseconds.

For measuring the S.A.T.T. pulse duration, the master selector switch is positioned so as to electrically connect the S.A.T.T. contacts of the telephone dial through a conductor 32 to the gate tube unit 22. The S.A.T.T. contacts are normally open and are usually made or closed on the 8th, 9th, or 10th dial pulse, or on a combination of these dial pulses. When the S.A.T.T. contacts are open, the gate tube unit 22 is closed so that the Schmitt trigger 12 is inoperative. However, during the make time for the S.A.T.T. contacts, the gate unit 22 is opened so that Schmitt trigger 12 operates, whereby the read out in milliseconds of the decade counter unit 14 will correspond to the total make time on the S.A.T.T. contacts.

A reset bus 34 is electrically connected to each of the decade counter tubes of the decade counter unit sections 16, 18 and 20, and to the pulse counter unit 26. Resetting of all of the decade counter tubes is accomplished by applying a sufficient voltage to the reset bus 34 to momentarily increase the potential of all decade counter tube elements in the amount of at least a predetermined minimum reset voltage above the zero position cathode, which will return all of the decade counter tubes to the zero position.

Figure 2:
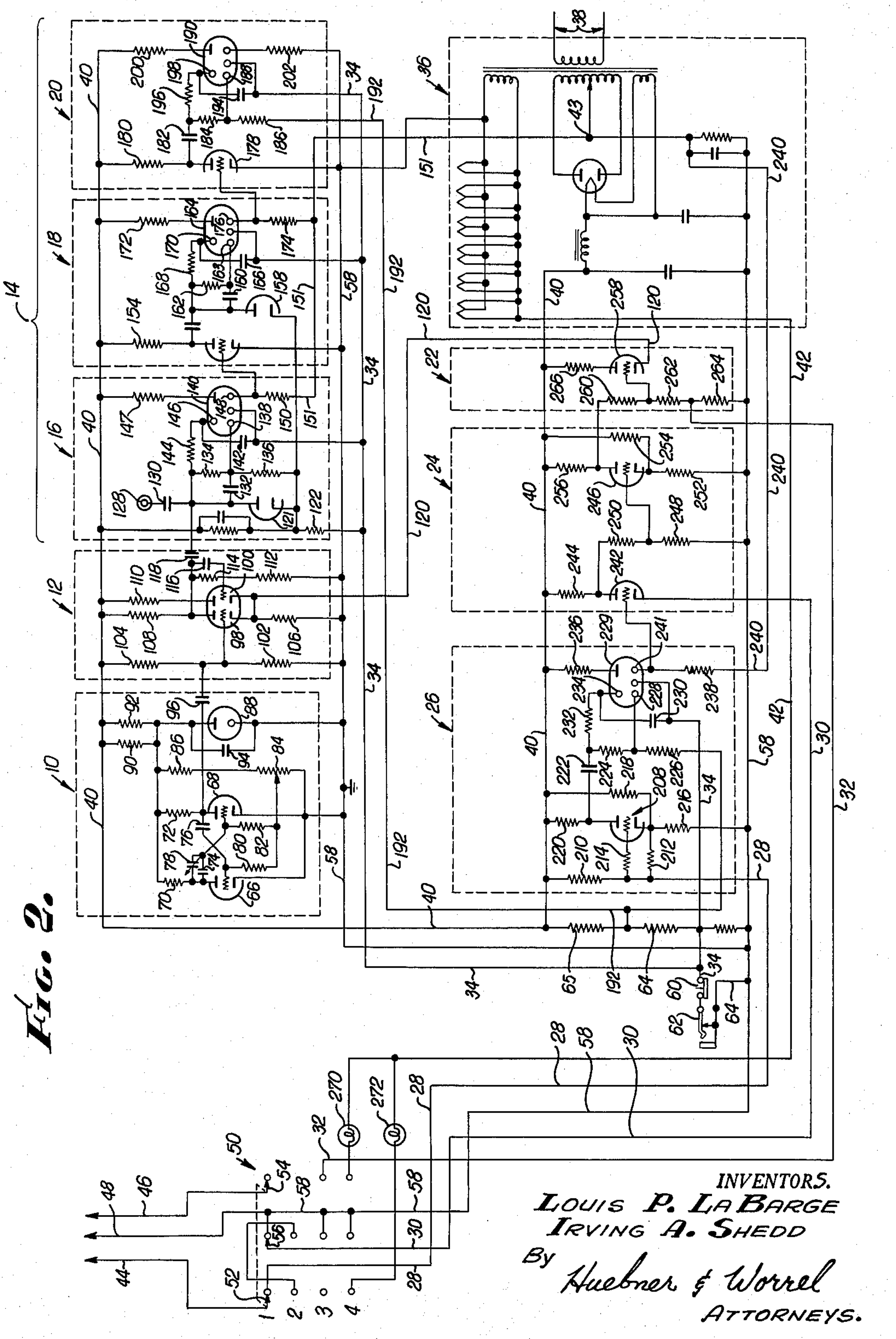
FIG. 2 is a detailed wiring diagram of the present invention.

The simplified block diagram of FIG. 1 illustrate only the electronic components of the invention, and does not show the electrical circuit including two incandescent lamps for visual measurement of the S.A.T.T. overlap, this circuit being included in FIG. 2.

Referring now particularly to FIG. 2, a power supply unit 36 of generally conventional construction is provided. Power supply unit 36 has input conductors 38 adapted to receive power from a conventional 115 volt A.C. line source. The power supply unit 36 provides a $B^+$ voltage to $B^+$ bus 40. An example of a suitable $B^+$ voltage, to which the present invention is not necessarily limited, is approximately 320 volts D.C. Power supply unit 36 also provides A.C. power through A.C. output conductor 42 for the S.A.T.T. overlap lamps. A suitable voltage provided to conductor 42, to which the present invention is not necessarily limited, is about 6.3 volts. The power supply unit 36 further includes a source 43 of negative D.C. voltage, preferably but not necessarily approximately —17 volts D.C., this negative voltage being applied to the cathode load resistors of three of the decade counter tubes in the manner detailed hereinafter.

The present device is electrically connected to three conductors of the telephone dial in order to test the dial, a pulse contact conductor 44, a S.A.T.T. contact conductor 46, and a common conductor 48. Electrical connection is made by the pulse dial contacts in their make position between conductors 44 and 48, while similar electrical connection is made between conductors 46 and 48 when the S.A.T.T. contacts are in the make position.

The master selector switch 50 employed in the present invention is preferably of a type having three poles and four positions, the three poles being designated by the numerals 52, 54 and 56 in FIG. 2. When the device of the present invention is operatively connected to a telephone dial for testing the dial, the pulse contact conductor 44 is electrically connected to pole 52 of the switch, while the S.A.T.T. contact conductor 46 is electrically connected to pole 54 of the switch. Pole 56 of the switch is electrically connected to the conductor 30 which provides the information to driver-inverter unit 24 for determining the dial percent break or make-break ratio.

The common conductor 48 of the dial is electrically connected to ground conductor 58 of the circuit of the present invention.

The reset bus 34 is normally at ground potential, being electrically connected to the ground conductor 58 through a normally closed reset switch 60 and a closed circuit jack 62. Interruption of the connection between reset bus 34 and ground conductor 58 may be effected by actuation of either reset switch 60 or jack 62, and such interruption will cause a positive voltage to be applied to reset bus 34 for momentarily increasing the potential of all tube elements of the four decade counter tubes employed in the circuit so as to reset the decade counter tubes to the zero position. With the presently preferred type of decade counter tubes, reset is provided by applying a minimum of about 120 volts to reset bus 34 over the zero cathode potential of the decade counter tubes. This reset voltage is provided by a decade bias divider comprised of three resistors 63, 64 and 65 which are arranged in series between ground conductor 58 and $B^+$ bus 40. The reset bus 34 is electrically connected between resistors 63 and 64 so that when either reset switch 60 or jack 62 is opened the potential across resistor 63 will determine the potential of reset bus 34. However, resistor 63 is normally grounded out so that reset bus 34 is at ground potential by the aforesaid electrical connection between reset bus 34 and ground conductor 58 through switch 60 and jack 62.

Referring now to the timing circuit as such, the basic timing impulse is provided by the oscillator unit 10 which is shown as a free running multivibrator in the detailed schematic diagram of FIG. 2. The multivibrator oscillator includes a pair of triodes 66 and 68, which may be in a dual triode tube, the cathodes of triodes 66 and 68 being connected to ground conductor 58, and the triodes 66 and 68 having respective plate load resistors 70 and 72. The plate of triode 66 is coupled to the grid of triode 68 by means of oscillator coupling capacitor 74, while the plate of triode 68 is coupled to the grid of triode 66 by coupling capacitor 76. A trimmer capacitor 78 is arranged in parallel with coupling capacitor 74. The grids of triodes 66 and 68 are connected through respective grid return resistors 80 and 82 to a potentiometer 84 which permits adjustment of the oscillator frequency to substantially exactly 1000 c.p.s. Potentiometer 84 is arranged in series with a resistor 86 to provide a voltage divider extending between ground and the high voltage side of a voltage regulator tube 88 for the output of the oscillator, the high voltage sides of the plate load resistors 70 and 72 also being connected to the high voltage side of voltage regulator tube 88. Regulator tube 88 comprises a conventional gaseous regulator tube, having its cathode connnected to ground and its anode connected through load resistors 90 and 92 to the $B^+$ bus 40. A filter capacitor 94 extends across the voltage regulator tube 88.

The output from the multivibrator oscillator unit 10, derived from the plate of triode 68, is fed through a coupling capacitor 96 to the Schmitt trigger unit 12. The Schmitt trigger includes a pair of triodes 98 and 100, which may be in a dual triode tube, the oscillator output being fed to the grid of triode 98. The grid of triode 98 is biased by connection between a pair of input bias divider resistors 102 and 104 which are connected in series between the ground conductor 58 and $B^+$ bus 40.

The cathodes of Schmitt trigger triodes 98 and 100 are connected together, and are connected to ground conductor 58 through a cathode load resistor 106. Plate load resistors 108 and 110 are connected between the plates of triodes 98 and 100, respectively, and the $B^+$ bus 40. The grid of triode 100 is biased by connection between bias divider resistors 112 and 114 which are connected in series between ground conductor 58 and the plate of triode 98. Schmitt trigger coupling capacitor 116 connects the grid of triode 100 with the plate of triode 98 to complete the Schmitt trigger circuit, the output of the Schmitt trigger being from the plate of triode 98 through an output coupling capacitor 118.

The Schmitt trigger provides negative going spikes at the rate of 1000 c.p.s. during the intervals of time when the Schmitt trigger is operating.

Connected directly to the cathodes of the Schmitt trigger triodes 98 and 100 is a conductor 120 which comprises the output conductor of the gate tube unit 22. When the gate tube is conducting, current will flow through conductor 120 and thence though the Schmitt trigger cathode load resistor 106 to raise the cathode voltage of the Schmitt trigger above cutoff, so that the Schmitt trigger will not operate to pass the negative pulses from its output. However, when the gate tube is in its cutoff condition, current will not flow through conductor 120 and the cathode voltage of the Schmitt trigger will be below cutoff so that the Schmitt trigger conducts to pass the negative going spikes.

At the input of the units decade counter 16 is a diode clamp 121 which clamps the incoming pulse signal preferably to about —40 volts, diode clamp 121 having its cathode connected between a pair of resistors 122 and 124 which form a clamp level voltage divider, resistors 122 and 124 being connected in series between the reset bus 34 and $B^+$ bus 40, with a by-pass capacitor 126 disposed across resistor 124. The plate of diode clamp 121 is connected to the output side of the Schmitt trigger output coupling capacitor 118. If desired, a test terminal 128 may be connected to the plate of diode clamp 121 through a coupling capacitor 130 for checking the input signal to the decade counter unit 14.

The signal at the plate of diode clamp 121 is fed directly through an input coupling capacitor 132 and an input network comprising resistors 134 and 136 to the G–1 terminal 138 of units decade counter tube 140. Tube 140 is preferably but not necessarily a Sylvania type 6802 cold cathode decade counter tube. This type of tube provides an output pulse across its cathode resistor whenever the ion glow appears at the zero position.

The incoming signal is also fed through an input integrator network comprising a capacitor 142 and a resistor 144 to the G–2 terminal 146 of units decade counter tube 140 in the usual manner to provide a delay in the application of the input signal to the G–2 terminal as compared with the G–1 terminal.

Plate load resistor 147 is connected between the plate of counter tube 140 and the B+ bus 40, and the zero cathode 148 of counter tube 140 has connected thereto a cathode load resistor 150 which in turn is connected through a conductor 151 to the negative D.C. voltage source 43 of the power supply unit 36. As aforesaid, for the preferred type of decade counter tube, a negative voltage of about −17 volts is provided at the source 43.

The negative going input spike from the Schmitt trigger which is fed directly to G–1 terminal 138 and through the delaying network to G–2 terminal 146 causes the ion beam to progress around the units decade counter tube 140, one step for each negative pulse from the Schmitt trigger. For each ten pulses of the Schmitt trigger output, the ion beam makes one revolution of the units decade counter tube 140, and each time the ion beam passes the zero position, a positive output pulse is developed across the cathode load resistor 150 of counter tube 140.

The output at the zero cathode 148 of the units decade counter tube 140 is fed to the tens decade counter section 18, being fed directly to the grid of a triode driver 152 which has a plate load resistor 154 connected between its plate and the B+ bus 40. Thus, the output from the units decade counter tube 140 is both amplified and inverted by the triode driver 152. The output signal from the plate of driver 152 is fed through a coupling capacitor 156 and is clamped preferably to approximately −40 volts by a diode clamp 158 which has its cathode connected to the cathode of the other diode clamp 121, and which may share a dual diode tube with the diode 121. The signal is then fed though an input network comprising a coupling capacitor 160 and a resistor 162 to the G–1 terminal 163 of the tens decade counter tube 146, the input also being fed through a delay network composed of capacitor 166 and resistor 168 to the G–2 terminal 170 of tens decade counter tube 164. The tens decade counter tube 164 includes plate load resistor 172 arranged between its plate and the B+ bus, and also includes cathode load resistor 174 connected between the zero cathode 176 and the conductor 151 which is connected to the negative direct current voltage source 43 of the power supply unit.

As with the units counter tube 140, the tens decade counter tube 164 has an ion beam which progresses around the tube, one step for each input pulse from the units counter tube, and a positive output pulse appears across the cathode load resistor 174 for each ten input pulses, so that these output pulses across cathode load resistor 174 are at a frequency of 10 c.p.s.

The output from the zero cathode 176 of tens decade counter tube 164 is then fed to the hundreds decade counter section 20, being introduced to the grid of a triode driver 178, which may form one-half of a dual triode unit including the triode driver 152. Driver 178 has a plate load resistor 180 connected between its plate and the B+ bus 40, and the output from the plate of driver 178 is amplified and inverted as compared with the input, so that negative pulses are fed from the plate of driver 178 through a coupling capacitor 182 and a hundreds decade counter input network including resistors 184 and 186 to the G–1 terminal 188 of hundreds decade counter tube 190. Bias is provided to this input network by means of a conductor 192 which is connected to the resistor 186 and is connected to the decade bias divider previously described at a point between the resistors 64 and 65.

The input signal to hundreds decade counter tube 190 is also fed through a delaying network including capacitor 194 and resistor 196 to the G–2 terminal 198. Plate load resistor 200 is connected between the plate and the B+ bus 40, and cathode load resistor 202 is connected between the zero cathode of counter tube 190 and the ground conductor 58.

The ion beam of the hundreds decade counter tube 190 makes one complete revolution for every 1000 pulses applied to the decade counter unit 14 from the Schmitt trigger, the read out on all three of the decade counter tubes counting each integer from 000 to 999; each time 999 being exceeded, the read out beginning again at 000.

Particular reference will now be made to the circuitry involved in pulse counter unit 26, driver-inverter unit 24 and the gate tube unit 22.

The pulse counter unit 26 includes an input driver triode 208. The driver 208 has associated therewith a grid bias divider including resistors 210 and 212 which are connected between B+ bus 40 and the cathode of tube 208. The input signal for driver 208 is provided from dial pulse conductor 28 when the selector switch 50 is set in its first position, for testing dial speed. Dial pulse conductor 28 is connected to the grid of driver tube 208 through a grid limiter resistor 214.

The cathode of driver tube 208 is biased by means of a cathode bias divider which includes resistors 216 and 218 that are connected between the ground conductor 58 and B+ bus 40. Driver tube 208 also has a plate load resistor 220 connected between its plate and bus 40.

When the dial speed measurement is to be taken, and the selector switch 50 is in the first position, the pulse contacts of the dial are connected to the pulse conductor 28, and since the dial pulse contacts are normally closed, conductor 28 will normally be grounded so as to ground the junction between resistors 210, 212 and 214. Since the cathode of tube 208 is normally biased by its voltage divider to a voltage of on the order of 25 volts, tube 208 will normally be cut off. However, when the dial pulse contacts are in the break position, tube 208 will be biased to its conducting condition. In all other positions of the selector switch 50, the dial pulse conductor 28 will be open, and tube 208 will be in its conducting condition.

The plate of tube 208 is coupled through capacitor 222 and an input network composed of resistors 224 and 226 to the G–1 terminal 228 of pulse counter tube 229, which is a decade counter tube like the tubes 140, 164 and 190. The resistor 226 is connected to a point between resistors 64 and 65 of the decade bias divider composed of resistors 63, 64 and 65. Pulses from driver tube 208 are delayed in an integrator network which includes capacitor 230 and resistor 232 and are applied to the G–2 terminal 234 of counter tube 229. Counter tube 229 also includes plate load resistor 236 connected between its plate and bus 40, and further includes cathode load resistor 238 which is connected through conductor 240 to the negative D.C. voltage source 43 of the power supply unit. The pulse counter tube 229 will normally have its ion glow at the zero position corresponding to the zero cathode 241 to which the cathode load resistor 238 is connected, the cathode 241 normally being at a positive voltage, on the order of 25 volts, due to the conduction of the ion glow.

Cathode 241 of counter tube 229 is connected to the grid of a triode driver 242 comprising the input of the driver-inverter unit 24. In the first position of selector switch 50 for testing dial speed, the cathode of driver tube 242 is connected to ground bus 58 through conductor 30; but in the second position of selector switch 50 for testing the dial percent break, the cathode of driver tube 242 is connected through conductor 30 to the dial pulse contacts. Since the dial pulse contacts are normally closed, the cathode of tube 242 will normally be grounded in the second position of the selector switch 50 as well as in the first position of the switch 50, and the positive input voltage derived from cathode 241 of the counter tube 229 will thus normally bias driver tube 242 to its conducting condition. Tube 242 has a plate load resistor 244 connected between its plate and bus 40. The driver tube 242 may share a dual triode tube with the driver tube 208.

The output from the plate of driver tube 242 is fed to the grid of phase inverter triode 246, the grid of tube 246 being biased by a grid divider composed of resistors 248 and 250 connected between ground conductor 58 and the plate of tube 242. The cathode of tube 246 is connected to a bias divider comprising resistors 252 and 254 connected between ground conductor 58 and B+ bus 40, and the immediate circuit of tube 246 is completed by plate load resistor 256 connected between the plate and B+ bus 40.

The relationship between driver tube 242 and phase inverter tube 246 is such that whenever driver tube 242 is conducting, inverter tube 246 will be cut off; but whenever tube 242 is in its cutoff condition, inverter tube 246 will be conducting.

The output from the plate of inverter tube 246 is fed to the gate tube unit 22, being fed to the grid of triode gate tube 258 through a resistor 260 comprising part of a gate grid divider which includes resistors 260, 262 and 264 connected in series between the plate of tube 246 and ground conductor 58. The grid of gate tube 258 is thus connected between resistors 260 and 262, and also the S.A.T.T. pulse conductor 32 is connected to this same divider between the resistors 262 and 264.

The gate tube 258 includes as part of its immediate circuit plate load resistor 266 which is connected between its plate and B+ bus 40. The gate tube 258 may share a dual triode tube with inverter tube 246.

The output from gate tube 258 comprises the conductor 120 which connects the cathode of gate tube 258 with the cathodes of the Schmitt trigger triodes.

The detailed operation of the present invention will now be described. To test the dial speed, selector switch 50 is set at its first position, wherein the dial pulse contacts are connected to dial pulse conductor 28, and the conductor 30 which connects with the cathode of driver tube 242 is connected to ground. The reset switch 60 is opened momentarily so as to reset all of the counter tubes 140, 164, 190 and 229 to the zero position.

At this time the steady state of the tester is as follows: the dial pulse contacts are normally closed, so that the input to driver tube 208 of the pulse counter unit 26 is grounded, and the tube 208 is cut off. The pulse counter tube 229 of counter unit 26 is at the zero position, with its cathode 241 at a positive potential due to the conduction of the ion glow, which causes the driver tube 242 of driver-inverter unit 24 to conduct, cutting off the phase inverter tube 246 of unit 24. This in turn causes the gate tube 258 of gate unit 22 to conduct heavily and provide current through conductor 120 and thence through the cathode load resistor 106 of the Schmitt trigger unit 12, which raises the cathode voltage of the Schmitt trigger to the cutoff condition of the Schmitt trigger. Thus, in the steady state, the Schmitt trigger unit 12 is cut off and pulses will not be provided to the decade counter unit 14.

The number zero of the telephone dial is dialed all of the way clockwise, and the dial is released, which results in the following sequence of events: Immediately upon release of the dial, the pulse contacts on the dial break, opening the input conductor 28 to driver tube 208 of counter unit 26 and causing the tube 208 to conduct, conduction of tube 208 causing the plate voltage thereof to decrease rapidly so as to apply a negative pulse to the pulse counter tube 229, which results in a transfer of the ion glow in tube 229 from the zero position to position 1. As there is no longer a current flowing through the cathode resistor 238 of counter tube 229, and because of the negative voltage applied to resistor 238 through conductor 240, driver tube 242 of unit 24 is cut off, which raises its plate voltage and causes conduction of phase inverter tube 246. This in turn lowers the voltage applied to the grid of gate tube 258, cutting tube 258 off and removing the current through the Schmitt trigger cathode resistor 106 so that the Schmitt trigger is biased normally and now operates. The decade counter unit 14 is now provided with pulses from the Schmitt trigger, at the rate of one pulse every millisecond of time.

When the end of the first dial pulse break occurs, tube 208 of unit 26 is again cut off and its plate goes positive. However, this has no effect on counter tube 229, as it is responsive only to negative pulses. Accordingly, the Schmitt trigger continues to provide pulses to the decade counter unit 14.

At the start of the second pulse, the dial pulse contacts open, allowing the grid of driver tube 208 in unit 26 to go positive, driving its plate negative and applying a negative pulse to the pulse counter tube 229 of unit 26, which causes tube 229 to step to position 2. As current is still not flowing through the cathode resistor 238 of counter tube 229, the gate 22 still remains open and the Schmitt trigger continues to provide pulses to the decade counter unit 14.

With each succeeding dial pulse through the ninth pulse the Schmitt trigger accordingly continues to drive the decade counter unit 14, the only change occurring in the entire circuit being the movement of the ion glow in counter tube 229 of unit 26 each time the dial pulse contacts open at the commencement of a new pulse.

At the start of the tenth pulse, corresponding to the end of the ninth pulse, when the dial pulse contacts open, driver tube 208 of unit 26 functions as before by supplying a negative pulse to the pulse counter tube 229, but this pulse causes the ion glow to step from nine to zero, and at the zero position current again flows through the cathode resistor 238 of counter tube 229, raising the voltage of cathode 241 of tube 229 so as to cause driver tube 242 of unit 24 to conduct, phase inverter tube 246 of unit 24 to be cut off, and gate tube 258 to conduct, which then cuts off the Schmitt trigger 12. The decade counter unit 14 has thus received one pulse each millisecond from the start of the first dial pulse to the end of the ninth dial pulses or start of the tenth pulse, and will thus display the time in milliseconds for a full nine pulses of the dial. Accordingly, for a dial properly adjusted to ten pulses per second, the reading on the decade counter unit 14 would be 900. For speeds above ten pulses per second the time indicated on decade counter unit 14 would be corresponding less, while for speeds lower than ten pulses per second the time displayed would be greater.

The use of the pulse counter tube 229 in unit 26 which provides cathode current due to the ion glow only at the zero position has a great advantage over other types of counting tubes or circuits, in that the dial must produce exactly 10 pulses, no more and no less, to stop the display on decade counter unit 14. If pulses are missed, the ion glow will not step to the zero position, and no voltage will be developed across the cathode resistor 238 of counter tube 229, so that the decade counter unit 14 will continue counting. Conversely, if more than 10 pulses are presented to the pulse counter tube 229 of unit 26, the ion glow will step beyond zero, thus again permitting the decade counter unit 14 to continue counting. Accordingly, whenever the decade counter unit 14 continues counting after the dial has returned to its normal position, it is a positive indication that an incorrect number of pulses has been received from the dial. The positioning of the ion glow of the pulse counter tube 229 of unit 26 informs the operator as to whether more or less than 10 pulses has occurred.

Preferably, the dial speed test just described is the first test made on the dial, and the dial will be adjusted according to the information presented on decade counter unit 14 until the counter unit 14 indicates the desired dial speed. It will be understood, of course, that where one speed measurement is made and then the dial is adjusted and the second speed measurement is made, the various decade counter tubes will be returned to the zero position by momentary opening on the reset switch 60 before the second test is made.

After the dial speed has been properly adjusted, the selector switch 50 is moved to the second position for measuring the dial percent break, or the make-break ratio. In this second position of switch 50, the dial pulse contacts are connected to conductor 30, and hence to the cathode of the input driver tube 242 of driver-inverter unit 24. The reset switch 60 is momentarily depressed causing all decade counter tubes to return to zero.

The steady state of the dial test set is now as follows: The input driver tube 208 of unit 26 is not used during this test, although it will be conducting, and the pulse counter tube 229 in unit 26 is at the zero position, whereby current is flowing through its cathode resistor 238 so as to drive the grid of tube 242 of unit 24 positive relative to its cathode, whereby tube 242 is in the conducting state. Since driver tube 208 of unit 26 does not pass any pulses, the counter tube 229 of unit 26 will remain at the zero position.

Since driver tube 242 of unit 24 is conducting, phase inverter tube 246 will be cut off, and gate tube 258 of unit 22 will be conducting heavily and the Schmitt trigger 12 will be cut off and will not be providing pulses to decade counter unit 14.

When the dial is rotated all of the way clockwise and released, the following sequence of events occurs: The dial pulse contacts break at the commencement of the first dial pulse, opening the cathode of driver tube 242 of unit 24 and thus cutting off tube 242. This causes inverter tube 246 to conduct, cutting off gate tube 258 and causing the Schmitt trigger to operate and feed pulses to the decade counter unit 14.

When the dial contacts close, driver tube 242 of unit 24 again conducts, cutting off inverter tube 246 and allowing gate tube 258 to conduct, which cuts off the Schmitt trigger 12 and stops the pulses to decade counter unit 14.

For each succeeding dial pulse this process is repeated, until all ten pulses from the dial are complete. Since the Schmitt trigger has provided pulses to the decade counter unit 14 only during the ten intervals of time that the dial pulse contacts were in the break position, the read out on decade counter unit 14 will indicate the total time in milliseconds that the pulse dial contacts were in the break condition. To determine the percent break of the dial contacts, the read out on decade counter unit 14 is multiplied by .01 times the dial speed in pulses per second. As an example, where the dial speed has been determined as 10 pulses per second, and the read out on decade counter unit 14 is 600, the percent break is determined by multiplying 600 times 10 times .01, giving a percent break value of 60%. A read out of 546 at 11 pulses per second would likewise give a percent break figure of 60%.

In order to measure the S.A.T.T. pulse duration, the selector switch 50 is moved to position 3, in which the S.A.T.T. pulse contacts are connected to conductor 32 which leads to the grid divider of the gate tube 258, and in this position of the switch the pulse contacts are not connected to the circuit. Again, the reset switch 60 is momentarily depressed, causing all decade counter tubes to return to zero.

The steady state of the tester now is as follows: Input driver tube 208 of unit 26 is conducting, but is not involved in the test. Pulse counter tube 229 of unit 26 is at the zero position, and remains at this position during the test, with current flowing through its cathode resistor 238, which causes the driver tube 242 of unit 24 to conduct. This in turn cuts off phase inverter tube 246 of unit 24, causing gate tube 258 of unit 22 to conduct, shutting off Schmitt trigger 12, whereby pulses are not provided to the decade counter unit 14.

When the dial is rotated and released, as the dial is returning to its initial position, the S.A.T.T. contacts will close, grounding the junction between resistors 262 and 264 which form part of the grid divider of the gate tube 258, or stated otherwise, short-circuiting the resistor 264 of the gate tube grid divider. This lowers the grid voltage of the gate tube 258 below cutoff, which causes the Schmitt trigger to operate and supply the 1000 c.p.s. oscillations to decade counter unit 14. This operation is repeated for all S.A.T.T. pulses as the dial is returning to normal, and the read out on decade counter unit 14 will be the total time in milliseconds for all S.A.T.T. pulses. The read out is then divided by the number of S.A.T.T. pulses per dial revolution. For example, should there be two S.A.T.T. cams in the dial, and accordingly two S.A.T.T. pulses, with read out of 60 the S.A.T.T. pulse duration would be 60 divided by 2, or 30 milliseconds.

The S.A.T.T. overlap is measured by visual means of lights in the fourth position of the selector switch 50. Two lamps are provided, a S.A.T.T. pulse lamp 270, and a dial pulse lamp 272. One side of each of the lamps 270 and 272 is connected to the A.C. voltage conductor 42 which provides A.C. voltage for the lamps from the power supply unit 36. The other side of the S.A.T.T. lamp 270 is, in the fourth position of selector switch 50, connected to the S.A.T.T. contacts of the dial, while the other side of the dial pulse lamp 272 is connected to the pulse contacts of the dial. For convenience in making this test it is useful to have different colors for the lamps, as for example a green S.A.T.T. pulse lamp 270 and a red dial pulse lamp 272.

The S.A.T.T. overlap test is made by rotating the dial and then slowly returning the dial to normal. Whenever the dial pulse contacts are in their make position, the dial pulse lamp 272 will go on, and likewise whenever the S.A.T.T. pulse contacts are made, the S.A.T.T. pulse lamp 270 will go on. For a proper sequence, the S.A.T.T. pulses should only be in the make position during the time that the pulse contacts are in the make position. Accordingly, for a proper sequence, as the dial is slowly returned to normal, the dial lamp 272 should first come on and then the S.A.T.T. lamp 270 will come on; and the S.A.T.T. lamp 270 will be first to go out, and then the pulse lamp 272 will go out. If other than this sequence occurs, the overlap is out of adjustment.

While we have herein shown and described our invention in what is conceived to be the most practical and preferred embodiment, it is recognized that departures may be made therefrom within the scope of the invention, which is not to be limited to the details disclosed herein, but is to be accorded the full scope of the claims so as to embrace any and all equivalent devices.

We claim:

1. A telephone dial tester which comprises pulse generator means for producing electrical pulses at a predetermined frequency, a counter unit connected to said pulse generator means and adapted to count the number of pulses it receives from the pulse generator means, said counter unit including means visually indicating the number of pulses received by the counter unit from the pulse generator means, electronic gate circuit means connected to said pulse generator means and controllable between a closed condition in which pulses from the pulse generator means are not fed to the counter unit and an open condition in which pulses are fed from the pulse generator means to the counter unit, and control circuit means connected to the gate circuit means and connectable to contacts of a telephone dial, said control circuit means causing said gate circuit means to shift from its closed condition to its open condition and back to its closed condition in response to movements of the telephone dial contacts.

2. A telephone dial tester as defined in claim 1, wherein said control circuit means is connectable to the dial pulse contacts of a telephone dial which provide ten dial pulses each of which pulses commences by opening of said dial pulse contacts, said control circuit means opening said gate circuit means when the dial pulse contacts open at the commencement of the first of the ten dial pulses and closing said gate circuit means when the dial pulse contacts open at commencement of the tenth dial pulse, whereby said counter unit will receive pulses from said pulse generator means continuously for the duration of nine dial pulses.

3. A telephone dial tester as defined in claim 1, wherein said control circuit means is connectable to the dial pulse contacts of a telephone dial which provide ten dial pulses, the dial pulse contacts opening and closing ten times, said control circuit means opening said gate circuit means each time the dial pulse contacts open and closing said gate circuit means each time the dial pulse contacts again close, whereby said counter unit will receive pulses from said pulse generator means for the summation of the time intervals that the dial pulse contacts are open.

4. A telephone dial tester as defined in claim 1, wherein said control circuit means is connectable to the automatic toll ticketing contacts of a telephone dial, said control circuit means opening said gate circuit means each time the automatic toll ticketing contacts close and closing said gate circuit means each time the automatic toll ticketing contact open, whereby said counter unit will receive pulses from said pulse generator means for the total time that the automatic toll ticketing contacts are closed.

5. A telephone dial tester as defined in claim 1, wherein said predetermined frequency of the pulse generator means is approximately 1000 cycles per second, whereby the number of pulses counted and visually indicated by said counter unit will correspond to the number of milliseconds of time the gate circuit means is in its open condition.

6. A telephone dial tester as defined in claim 1, wherein said pulse generator means include an electronic trigger circuit output portion to which said gate circuit means is connected.

7. A telephone dial tester which comprises pulse generator means for producing electrical pulses at a predetermined frequency, a counter unit connected to said pulse generator means and adapted to count the number of pulses it receives from the pulse generator means, electronic gate circuit means connected to said pulse generator means and controllable between a closed condition in which pulses from the pulse generator means are not fed to the counter unit and an open condition in which pulses are fed from the pulse generator means to the counter unit, and control circuit means connected to the gate circuit means and connectable to the dial pulse contacts of a telephone dial which provide ten dial pulses, each of which pulses commences by opening of said dial pulse contacts, the dial pulse contacts opening and closing ten times, said control circuit means including a selector switch, said control circuit means in one position of the switch opening said gate circuit means when the dial pulse contacts opens at the commencement of the first of the ten dial pulses and closing said gate circuit means when the dial pulse contacts open at the commencement of the tenth dial pulse whereby said counter unit will receive pulses from said pulse generator means continuously for the duration of nine dial pulses, and said control circuit means in another position of the switch opening said gate circuit means each time the dial pulse contacts open and closing said gate circuit means each time the dial pulse contacts again close whereby said counter unit will receive pulses from said pulse generator means for the summation of the time intervals that the dial pulse contacts are open.

8. A telephone dial tester as defined in claim 7, wherein said control circuit means is also connectable to the automatic toll ticketing contacts of the telephone dial, and said control circuit means in a third position of the switch opening said gate circuit means each time the automatic toll ticketing contacts close and closing said gate circuit means each time the automatic toll ticketing contacts open, whereby said counter unit will receive pulses from said pulse generator unit for the total time that the automatic toll ticketing contacts are closed.

9. A telephone dial tester as defined in claim 8, which includes a pair of lamps, said switch in a fourth position connecting one of said lamps to the pulse dial contacts and the other lamp to the automatic toll ticketing contacts, so that each of said lamps will be illuminated when its respective contacts are closed, the on-off sequence of the lamps providing visual measurement of the automatic toll ticketing overlap.

10. A telephone dial tester which comprises pulse generator means for producing electrical pulses at a predetermined frequency; a counter unit connected to said pulse generator means and adapted to count the number of pulses it receives from the pulse generator means; gate means connected to said pulse generator means and controllable between a closed condition in which pulses from the pulse generator means are not fed to the counter unit and an open condition in which pulses are fed from the pulse generator means to the counter unit; and control circuit means connected to the gate means and connectable to the dial pulse contacts of a telephone dial which provide ten dial pulses, the dial pulse contacts opening and closing ten times, said control circuit means including an ion glow type of decade counter tube having a cathode load connected to its zero cathode so that a voltage will be provided across the load when the ion glow is at the zero cathode position, an input driver tube having its input connectable to the telephone dial pulse contacts and having its output connected to the input of said decade counter tube, said driver tube feeding a pulse to said decade counter tube at the commencement of each of the ten dial pulses so as to shift the ion glow from the zero cathode position through successive positions corresponding to the successive dial pulses until the start of the tenth dial pulse shifts the ion glow back to the zero cathode position, and a connection between said cathode load and said gate means so that when the ion glow is at the zero cathode said load voltage will hold said gate means closed and when the ion glow is at its other positions said gate means will be open; whereby in the normal condition of the tester with the ion glow at the zero cathode the gate means will be closed, and when the dial is rotated to its full extent and released the gate will open at the start of the first of the ten dial pulses and will close at the start of the tenth dial pulse so that said counter unit will receive pulses from said pulse generator means for the duration of nine dial pulses.

11. A telephone dial tester as defined in claim 10, wherein said control circuit means includes a selector switch which in a first position connects the telephone dial pulse contacts to the input of said input driver tube, and in a second position connects the telephone dial pulses to said control circuit means at a point subsequent to said decade counter tube; said gate means in said second position of the selector switch opening each time the dial pulse contacts open and closing each time the dial pulse contacts again close, whereby said counter unit will receive pulses from said pulse generator means for the total time that the dial pulse contacts are open.

12. A telephone dial tester as defined in claim 11, wherein said switch has a third position wherein it connects the automatic toll ticketing contacts of the telephone dial to said control circuit means at a point subsequent to said decade counter tube; said gate means in said third position of the selector switch opening each time the automatic toll ticketing contacts close and closing each time the automatic toll ticketing contacts open, whereby said counter unit will receive pulses from said pulse generator means for the total time that the automatic toll ticketing contacts are closed.

13. A telephone dial tester as defined in claim 11, wherein said predetermined frequency of the pulse generator means is approximately 1000 cycles per second, whereby the number of pulses counted by the counter unit will correspond to the number of milliseconds of time the gate means is in its open condition.

14. A telephone dial tester as defined in claim 13, wherein said counter unit comprises a series arrangement of three decade counter tubes, the first decade counter tube receiving and indicating each pulse from said pulse generator means and providing an electrical output pulse for each ten pulses it receives, the second decade counter tube receiving and indicating each output pulse from the first decade counter tube and providing an output pulse for each ten pulses it receives, and the third decade counter tube receiving and indicating each output pulse from the second decade counter tube.

15. A telephone dial tester as defined in claim 14, wherein said pulse generator means includes an electronic trigger circuit output portion to which said gate means is connected.

16. A telephone dial tester as defined in claim 15, wherein said pulse generator means includes a free running multivibrator the output of which is connected to said electronic trigger circuit.

17. A telephone dial tester which comprises pulse generator means for producing electrical pulses at a predetermined frequency, a counter unit connected to said pulse generator means and adapted to count the number of pulses it receives from the pulse generator means, gate means connected to said pulse generator means and controllable between a closed condition in which the pulses from the pulse generator means are not fed to the counter unit and an open condition in which pulses are fed from the pulse generator means to the counter unit, and control circuit means connected to the gate means and connectable to contacts of a telephone dial, said control circuit means causing said gate means to shift from its closed condition to its open condition and back to its closed condition in response to movement of the telephone dial contacts, said predetermined frequency of the pulse generator means being approximately 1,000 cycles per second, whereby the number of pulses counted by said counter unit would correspond to the number of milliseconds of time the gate means is in its open condition, and said counter unit comprising a series arrangement of three decade counter tubes, the first decade counter tube receiving and indicating each pulse from said pulse generator means and providing an electrical output pulse for each ten pulses it receives, the second decade counter tube receiving and indicating each pulse from the first decade counter tube and providing an output pulse for each ten pulses it receives, and the third decade counter tube receiving and indicating each output pulse from the second decade counter tube.

References Cited by the Examiner

UNITED STATES PATENTS

| | | | |
|---|---|---|---|
| 2,500,287 | 3/1950 | Kent | 179—175.2 |
| 2,732,441 | 1/1956 | Gatzert | 179—175.2 |
| 2,857,484 | 10/1958 | Culbertson | 179—175.2 |

ROBERT H. ROSE, *Primary Examiner.*

H. W. GARNER, F. N. CARTEN, *Assistant Examiners.*